(No Model.)

G. A. HENDERSON.
TIGHT OR LOOSE PULLEYS FOR ROUND BELTS OR CABLES.

No. 269,286. Patented Dec. 19, 1882.

Witnesses
Breckenridge Irwin
Luke Tozer

Inventor
George A Henderson
By John C Dupee
Atty.

UNITED STATES PATENT OFFICE.

GEORGE A. HENDERSON, OF DECATUR, ILLINOIS.

TIGHT AND LOOSE PULLEY FOR ROUND BELTS OR CABLES.

SPECIFICATION forming part of Letters Patent No. 269,286, dated December 19, 1882.

Application filed May 19, 1882. (No model.)

*To all whom it may concern:*

Be it known that I, GEORGE A. HENDERSON, a citizen of the United States, residing at Decatur, in the county of Macon and State of Illinois, have invented a new and useful Improvement in Tight and Loose Pulleys for Round Belts or Cables, of which the following is a specification.

My invention relates to improvements in the construction and arrangement of tight and loose pulleys for use with round belts or cables.

The object of my improvement is to provide a simple device by means of which motive power may be conveyed to sewing, knitting, and other machines, and at the same time be under control of the operator; and it consists of the following essential points: first, a grooved pulley having one high and one low side, provided with a central turned hub projecting from its low side; second, a similar or slightly smaller pulley supported by and fitted to revolve freely on the turned hub of the fixed pulley, its low side placed next to the low side of the fixed pulley, so that the belt may be shifted from one to the other over their low sides, any of the well-known devices being employed for tht purpose. I attain these objects by the device illustrated in the accompanying drawings, in which—

Figure 1:
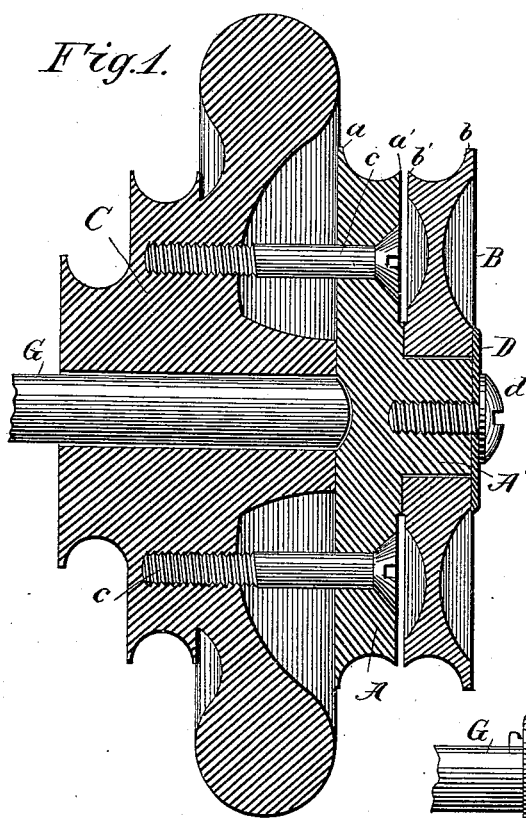
Figure 5:
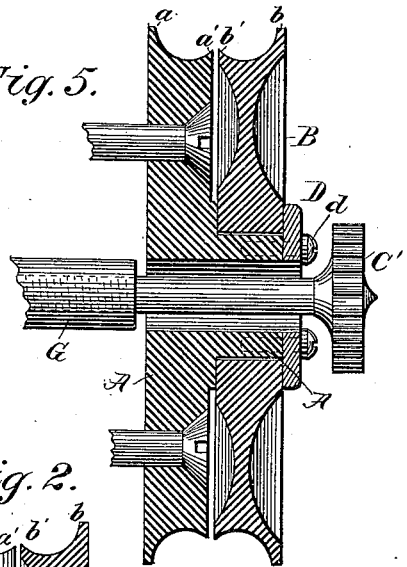
Figure 2:
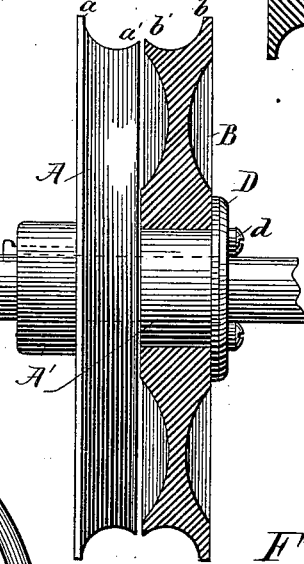
Figure 3:
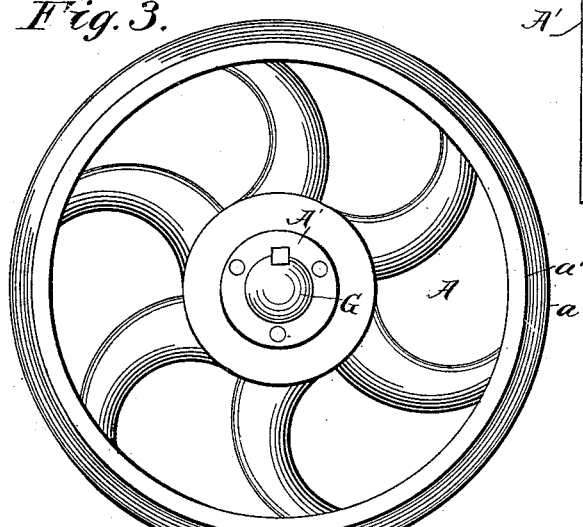
Figure 4:
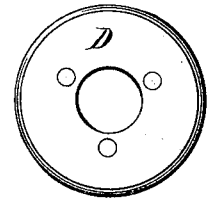

Figure 1 is a sectional view of the two pulleys as applied to a balance-wheel. Fig. 2 represents the two pulleys as applied to a shaft, the loose pulley being shown in section. Fig. 3 is a plan of the tight pulley shown in Fig. 2. Fig. 4 is a plan of the disk or washer which is secured to the outer end of the hub of the tight pulley, as in Figs. 2 and 5, to prevent lateral displacement of the loose pulley. Fig. 5 is a sectional view of the two pulleys adapted for use on sewing-machines which are provided with adjusting-screws for tightening and loosening the balance-wheel.

Similar letters refer to similar parts throughout the several views.

A represents the tight pulley, having a grooved face, with one high side, $a$, and one low side, $a'$, and provided with a central turned hub, A', projecting from its low side. Fitted onto this hub A' is a loose pulley, B, of equal or slightly smaller diameter, having a grooved face, with high and low sides $b$ and $b'$, with its low side next the pulley A. The loose pulley B is retained in proper position upon the hub A' by the disk or washer D, fastened to the outer end of said hub with one or more screws, $d\ d$, as shown in Figs. 1, 2, and 5.

$c\ c$ are screws which pass through the pulley A and screw into the balance-wheel C, attached to the end of a shaft, G, their heads being countersunk into the low side of said pulley, so as not to interfere with the movement of the loose pulley B. The pulley A shown in Fig. 5 is similar to the one shown in Fig. 1, and has a central hole through the hub to admit of the passage of the screw $c'$. This screw is not new, as herein applied, and is simply shown to better illustrate the application of the pulleys to the balance-wheel of sewing-machines that are provided with any one of the many well-known devices for engaging and disengaging the balance-wheel (as is done in many bobbin-winding machines.) The disk or washer D shown in this figure is secured to the end of the hub A with two or more screws, $d\ d$, the same as when applied to a shaft as shown in Fig. 2.

The tight pulley A in each view may be made a solid disk; or they may be cast with arms or spokes, similar to those shown in Fig. 3; or for extreme cheapness both pulleys may be made of wood.

I do not wish to confine myself to any special method of uniting the pulley A with the balance-wheel, as it is obvious that it may be cast to form a part of the balance-wheel, if desired; but in order to apply it to use with balance-wheels already made it may be secured thereto with screws, as shown in drawings, or in any other convenient manner.

The construction and application being described, its operation is as follows: The low side of each pulley being placed together, and a round belt or cable being placed on the grooved face of either pulley, is shifted from one to the other over their low sides by any of the well-known shifting devices.

Having thus described my invention, what I believe to be new, and desire to secure by Letters Patent, is—

1. The tight pulley A, having grooved face, with high side *a* and low side *a'*, a central turned hub (either solid or having a central hole) adapted to support a loose pulley, B, also having grooved face, with high and low sides *b* and *b'*, their low sides placed together to allow the belt or cable to pass from one to the other, substantially as and for the purpose specified.

2. The tight pulley A, having grooved face, with high side *a* and low side *a'*, a central turned hub (either solid or having a central hole) adapted to support a loose pulley, B, also having high and low sides *b* and *b'*, their low sides placed together when directly attached to the balance-wheel of sewing-machines, or when attached to the extended portion of the shaft of other light machinery, substantially in the manner shown, and for the purpose specified.

In testimony that I claim the foregoing-described combination as my invention I hereunto set my hand and affix my seal this 13th day of May, A. D. 1882.

GEO. A. HENDERSON. [L. S.]

Witnesses:
  S. F. GREER,
  C. L. WAGGONER.